United States Patent [19]

Yaguchi

[11] Patent Number: 5,051,672
[45] Date of Patent: Sep. 24, 1991

[54] AUTOMATIC WINDOW/DOOR SYSTEM

[75] Inventor: Osamu Yaguchi, Kashiwazaki, Japan

[73] Assignee: Kabushiki Kaisha Riken, Tokyo, Japan

[21] Appl. No.: 512,825

[22] Filed: Apr. 23, 1990

[30] Foreign Application Priority Data

| Apr. 28, 1989 | [JP] | Japan | 1-110355 |
| May 24, 1989 | [JP] | Japan | 1-132470 |
| Jul. 6, 1989 | [JP] | Japan | 1-175071 |
| Jul. 26, 1989 | [JP] | Japan | 1-193708 |
| Jan. 12, 1990 | [JP] | Japan | 2-5401 |
| Mar. 7, 1990 | [JP] | Japan | 2-55995 |

[51] Int. Cl.[5] .................. E05F 15/08; H02P 1/22
[52] U.S. Cl. ...................... 318/469; 318/266; 318/286; 318/434
[58] Field of Search .......... 318/264, 265, 266, 286, 318/293, 466, 467, 468, 469, 470, 434; 49/26, 27, 28, 34; 310/311, 328, 330, 331, 357

[56] References Cited

U.S. PATENT DOCUMENTS

| 3,651,389 | 3/1972 | Ito et al. ................. 318/286 X |
| 3,689,814 | 9/1972 | Holt ........................ 318/286 X |
| 4,234,833 | 11/1980 | Barrett ...................... 318/282 |
| 4,338,552 | 7/1982 | Pilz et al. |
| 4,529,920 | 7/1985 | Yoshida et al. ........... 318/468 X |
| 4,558,259 | 12/1985 | Craig |
| 4,608,637 | 8/1986 | Okuyama et al. ........ 318/103 X |
| 4,609,845 | 9/1986 | Soni et al. .................. 307/357 |
| 4,621,223 | 11/1986 | Murakami et al. ....... 318/286 X |
| 4,629,925 | 12/1986 | Booth et al. ................. 310/330 |
| 4,683,975 | 8/1987 | Booth et al. |
| 4,709,196 | 11/1987 | Mizuta ...................... 318/469 X |
| 4,746,845 | 5/1988 | Mizuta et al. .............. 318/286 |
| 4,773,183 | 9/1988 | Okushima et al. ............ 49/28 |
| 4,849,946 | 7/1989 | Beauducel ................ 310/331 X |
| 4,918,360 | 4/1990 | Tanaka et al. ............ 318/266 X |
| 4,943,757 | 7/1990 | Richter et al. ............ 318/468 X |

FOREIGN PATENT DOCUMENTS 60-71319  4/1985  Japan ............................. 49/28

Primary Examiner—Bentsu Ro
Attorney, Agent, or Firm—Parmelee, Bollinger & Bramblett

[57] ABSTRACT

An automatic window opening/closing system includes a motor for driving a window. In association with the window, a pressure responsive sensor (preferably, a pressure responsive sensor with a coaxial structure having uniform sensitivity to pressures in all directions) is provided. A detector circuit is coupled to the pressure responsive sensor and evaluates a rate of change of a pressure on the sensor, thereby detecting a squeezed object caught in a way of the window during an operation of the system. A motor control circuit is provided to control the motor in response to a squeezed object detection signal from the detector circuit in such a direction to release the object from the window. The motor control circuit detects an overload condition of the motor in accordance with a motor terminal voltage and deenergizes the motor to prevent the motor from generating heat. Therefore, this system achieves improved performance, high reliability and safety.

1 Claim, 12 Drawing Sheets

AUTOMATIC WINDOW/DOOR SYSTEM

BACKGROUND OF THE INVENTION

The present invention relates to a system for controlling a movable member such as a window or door controlling opening/closing of a window of an automobile or the like.

A known conventional automobile window automatic motor-driven opening/closing system includes an electric motor for driving a window so as to open/close the window, a pressure responsive sensor arranged in association with the window, a detector circuit, coupled to the pressure responsive sensor, for detecting an squeezed object (typically, a part of a human body such as a hand) caught in a way of the window during a closing operation of the window, and a control circuit, coupled to the detector circuit, for controlling the electric motor in response to the squeezed object in such a direction to open the window, thereby releasing the object from the window.

Such a conventional system, however, is unsatisfactory for the following reason. That is, response characteristics of the pressure responsive sensor change in accordance with its installation position of a window frame. An output from the pressure responsive sensor depends on a pressure on the pressure responsive sensor. The characteristics of the pressure responsive sensor are changed or degraded by aging. The detector circuit easily erroneously operates.

For example, even though a squeezed object is present, the detector circuit does not detect the object. To the contrary, the detector circuit erroneously detects a squeezed object although nothing is squeezed.

Therefore, a demand has arisen for a motor-driven window/door system with high reliability and safety.

SUMMARY OF THE INVENTION

According to the present invention, there is provided a motor-driven window/door system comprising: a pressure responsive sensor arranged in association with a window or door; detector circuit means coupled to the sensor for detecting a squeezed object caught in a way of the window or door; an electric motor for driving the window or door to open/close the window or door; and control circuit means for controlling the motor, wherein the sensor comprises a coaxial sensor having an inner electrode, an outer electrode and a pressure responsive element interposed between the inner and outer electrodes and having a variable resistance depending on a pressure on the sensor, the detector circuit means comprises pressure detector means coupled to the sensor for generating a signal indicative of a pressure on the sensor, and differentiation means coupled to the pressure detector means for generating a signal indicative of a rate of change of the pressure, and the control circuit means comprises direction control means coupled to the detector circuit means for controlling the motor in response to a squeezed object in the way of the window or door in such a direction to release the object (from the window or door), overload detector means coupled to the motor for detecting an overload condition of the motor and power-down means responsive to the overload detector means for restricting a power supplied to the motor.

The pressure responsive sensor of the above arrangement provides an essentially omnidirectional pressure responsive sensor. Since the detector circuit means of this arrangement detects not a pressure on the pressure responsive sensor but a rate of change of the pressure, a squeezed object detector device essentially insusceptible to aging and degradation is provided. The control circuit of the arrangement detects a constraint condition (overload condition) of the electric motor caused by a squeezed object and restricts a power supplied to the electric motor. Therefore, heat generation of the electric motor and an excessive electric motor current can be prevented.

BRIEF DESCRIPTION OF THE DRAWINGS

The above and other objects, features and advantages of the present invention will become more apparent from the following description with reference to the accompanying drawings, in which.

DETAILED DESCRIPTION OF THE PREFERRED EMBODIMENTS

Figure 1:
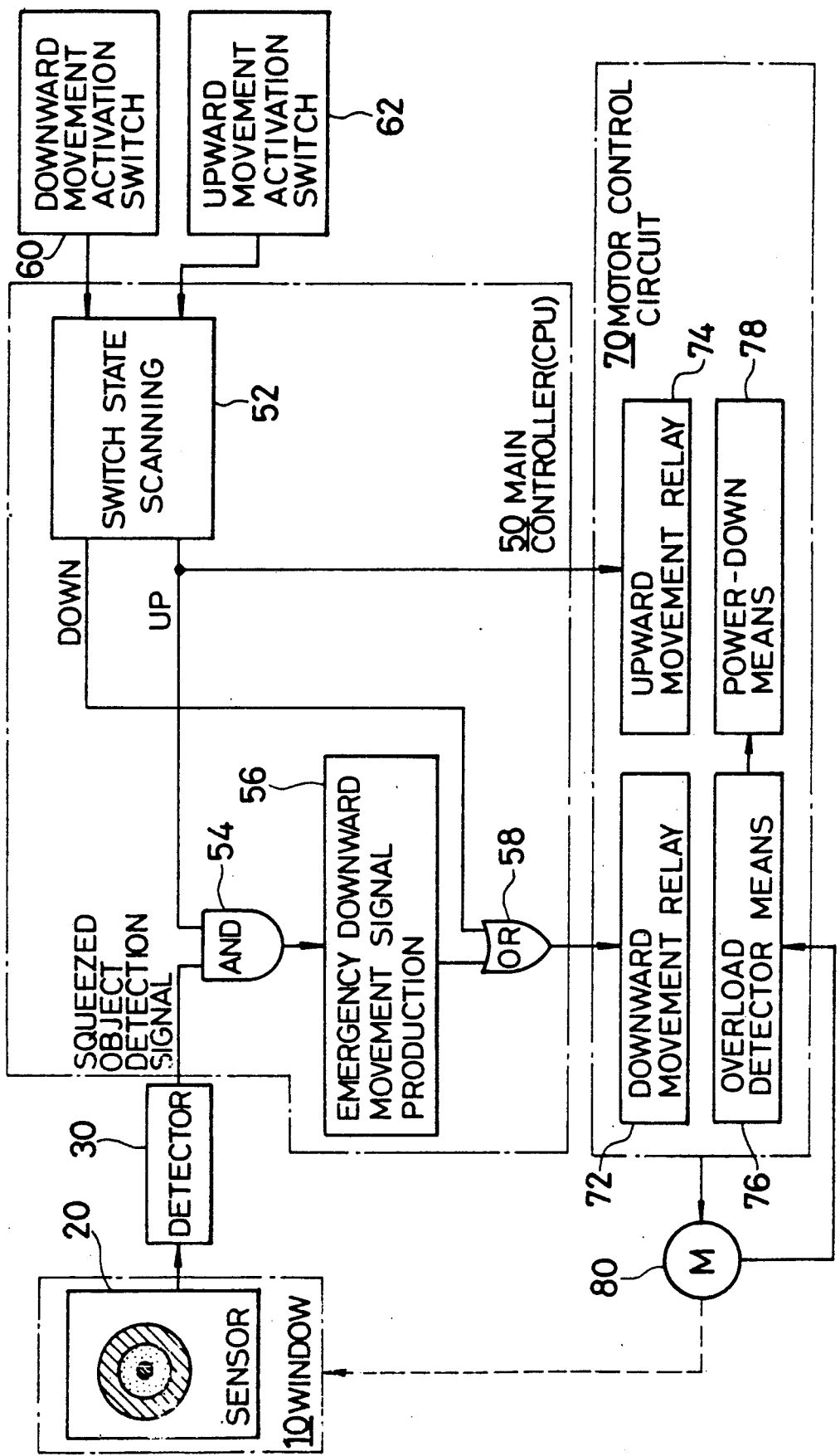
FIG. 1 is a block diagram showing an overall arrangement of a motor-driven window opening/closing system according to the present invention.

FIG. 1 shows a motor-driven window opening/closing system according to the present invention.

Figure 2:
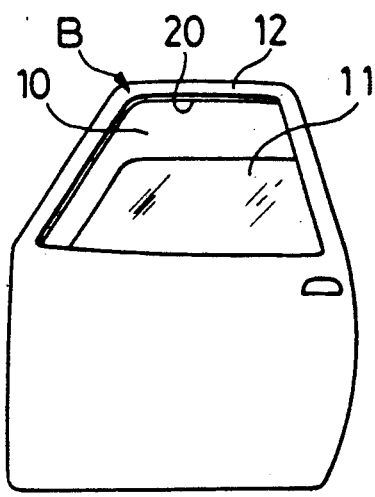
FIG. 2 is a front view showing a window of an automobile having a pressure responsive sensor.

This system is driven by an electric motor indicated by reference numeral 80 and includes a movable member such as a window of an automobile indicated by reference numeral 10. A pressure responsive sensor 20 is provided in association with the window 10. FIG. 2 shows the pressure responsive sensor 20 mounted on the window 10. Referring to FIG. 2, a window glass 11 is closed (in an upward movement direction) and opened (in a downward movement direction) by the electric motor 80. The linear pressure responsive sensor 20 is mounted along a frame of the window 10. The pressure sensor 20 is a resistive sensor having a variable resistance depending on a pressure on the sensor.

The pressure responsive sensor 20 is preferably constituted by a coaxial sensor omnidirectional to a pressure. A detector circuit 30 is coupled to the pressure sensor 20 and detects a squeezed object (e.g., an object 14 squeezed between the window glass 11 and a window frame 12 shown in FIG. 12A or 12B) caught in a way of the window 10 during an operation of the system. The detector circuit 30 preferably includes a differentiation circuit such as a capacitor for forming a signal indicative of a rate of change of a resistance of the sensor 20 and therefore a rate of change of a pressure.

The system further comprises a main controller 50 which can be realized by a microprocessor operated by programs. The main controller 50 is coupled to the detector circuit 30 and receives a signal indicative of a squeezed object from the detector circuit 30. The main controller 50 is also coupled to a downward movement (window opening) activation switch 60 and an upward movement (window closing) activation switch 62, both of which are manually operated.

In the main controller 50, states of the downward and upward movement activation switches 60 and 62 are periodically scanned (52), and signals DOWN and UP indicative of window opening and closing modes are formed. That is, when the downward movement activation switch 60 is depressed, the DOWN mode is established. When the upward movement activation switch 62 is depressed, the UP mode is established. In response to input signals from the detector circuit 30 and the downward and upward movement activation switches 60 and 62, the main controller 50 sends a signal for designating a moving direction of the glass 11 of the window 10.

When the UP mode is established upon depression of the upward movement activation switch 62, the main controller 50 energizes an upward movement relay 74 of the motor control circuit 70. Upon energization of the upward movement relay 74, the motor 80 is driven in such a direction to move (close) the window 10 upward. When the DOWN mode is established upon depression of the downward movement activation switch 60, the main controller 50 energizes a downward movement relay 72 of the motor control circuit 70. Upon energization of the downward movement relay 72, the motor 80 is driven in such a direction to move (open) the window 10 downward.

The window 10 may catch and squeeze an object while it is moved upward from an open to closed state. Such a squeezed object is detected by the detector circuit 30. If the main controller 50 receives a squeezed object detection signal from the detector circuit 30 during the UP mode, it generates an emergency downward movement signal via an AND gate 54 (56). The emergency downward movement signal is supplied to the motor control circuit 70 via an OR gate 58 which also receives the DOWN mode signal, thereby energizing the downward movement relay 72.

As a result, a rotating direction of the motor 80 is switched to move the window 10 downward, thereby releasing the object from the window 10.

In addition to the direction switching means such as the downward and upward movement relays 72 and 74 (which can be constituted by a single relay for switching the rotating direction of the motor 80), the motor control circuit 70 comprises an overload detector means 76, coupled to the motor 80, for detecting a constraint or overload condition (caused by a squeezed object) of the motor 80, and a power-down circuit means 78 coupled to the overload detection means 76 for restricting (interrupting or reducing) a power supplied to the motor 80 in response to the overload state of the motor 80. With this arrangement, heat generation of the motor 80 caused by an overload can be prevented.

Each component of the system shown in FIG. 1 will be described in detail below.

[A] Pressure Sensitive Sensor

Some conventional pressure responsive sensors are available as so-called pressure responsive switches.

Figure 3:
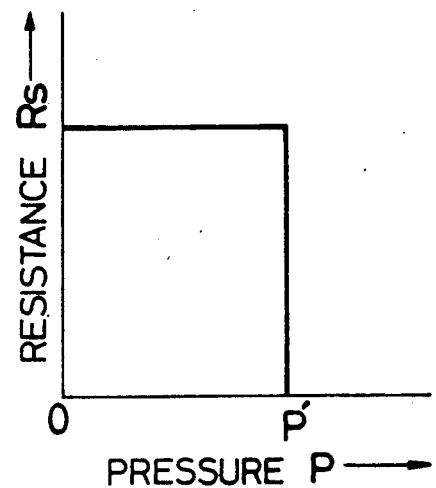
FIG. 3 is a graph showing pressure-resistance characteristics of a conventional pressure responsive sensor switch.

A pressure responsive sensor switch of this type has electrical characteristics as shown in a pressure-resistance characteristic graph of FIG. 3, That is, when a pressure P on the sensor switch is low, its resistance is very high (e.g., infinite). When a pressure higher than a threshold pressure P' or more is applied, the resistance varies to be a low value (e.g., 0).

An output from the ON/OFF type pressure responsive sensor of this type cannot quantitatively indicate the magnitude of a pressure applied to the sensor. In addition, the threshold pressure P' varies in accordance with an environmental change or aging. Furthermore, the pressure responsive sensor is often bent and mounted on a support member such as a window frame (see FIG. 2). Upon bending, a pressure is more or less applied to the pressure responsive sensor. In this respect, the ON/OFF type pressure responsive sensor is not suitable for use in the motor-driven window opening/closing system.

Figure 4:
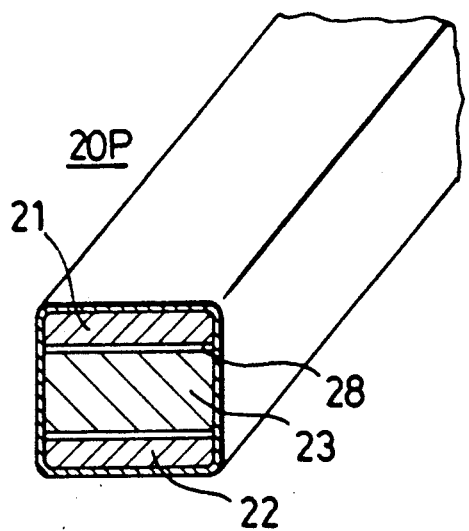
FIG. 4 is a perspective view showing a structure of a conventional pressure responsive sensor depending on a direction.

FIG. 4 shows a pressure responsive sensor of this type generally indicated by reference numeral 20P. This pressure responsive sensor 20P has a structure in which a pressure responsive element 23 having a variable resistance depending on a pressure on the sensor is interposed, via a gap 28, between elongated upper and lower electrodes 21 and 22 each having a substantially rectangular section. Because of a principle of this structure, sensitivity of the pressure responsive sensor 20P with respect to a pressure depends on a direction of a pressure on the sensor 20P. That is, the pressure responsive sensor 20P has maximum sensitivity to a pressure in a direction perpendicular to the two electrodes 21 and 22 and minimum sensitivity to a pressure in a direction parallel to the electrodes 21 and 22.

This directional pressure responsive sensor 20P is not suitable for an application of a motor-driven window opening/closing system because the pressure responsive sensor 20P is often mounted in a wrong direction of a window frame.

Figure 5:
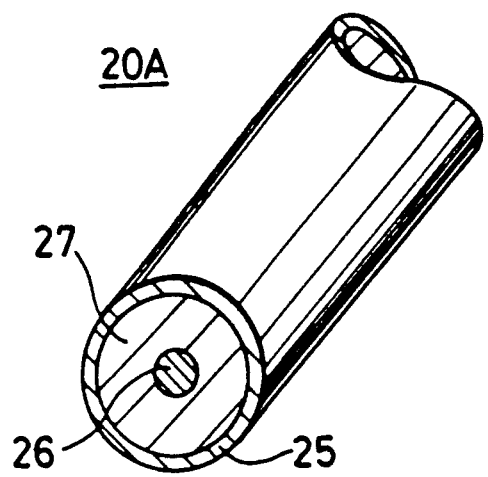
FIG. 5 is a perspective view showing a structure of a pressure responsive sensor insusceptible to a pressure direction suitable for use in the system shown in FIG. 1.

FIG. 5 shows an arrangement of a pressure responsive sensor suitable for use in the window opening/closing system (FIG. 1) generally indicated by reference numeral 20A. This pressure responsive sensor 20A comprises an elongated inner electrode 26, a cylindrical outer electrode 25 arranged coaxially with the inner electrode 26, and a pressure responsive element 27 formed between the inner and outer electrodes 26 and 25 and having a variable resistance depending on a pressure on the sensor 20A. Since the pressure responsive sensor 20A has this coaxial structure, its sensitivity to a pressure is essentially constant in all directions of a pressure on the sensor.

Figure 6:
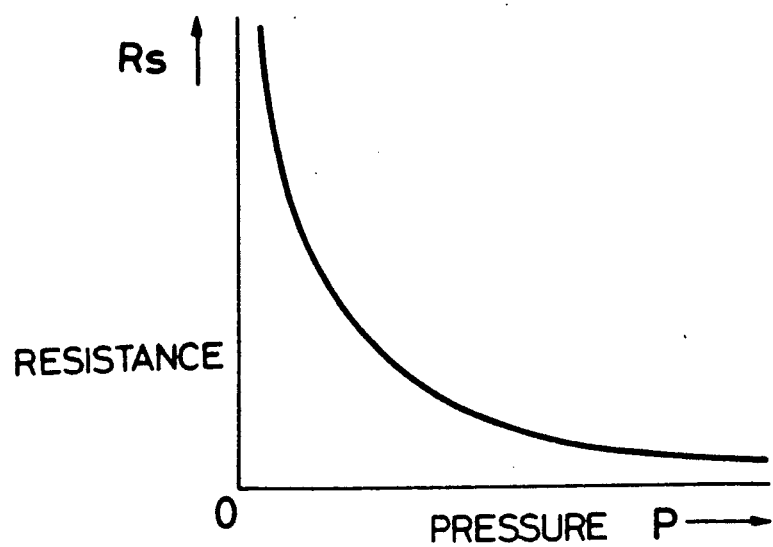
FIG. 6 is a graph showing pressure-resistance characteristics of the pressure responsive sensor shown in FIG. 5.

When the pressure responsive sensor 20A is to be mounted on a support such as the window frame, therefore, a mounting direction of the sensor 20A need not be particularly cared. In addition, the pressure responsive sensor 20A uniformly responds to a pressure in an arbitrary direction caused by a squeezed object upon operation. The pressure responsive element 27 is preferably arranged to have a resistance substantially inversely related to a pressure on the sensor 20A, as shown in FIG. 6.

Note that as a material of the pressure responsive element 27, pressure responsive conductive rubber such as #CS57-7RSC available from Yokohama Rubber Co., Ltd.

[B] Detector Circuit

Figure 7:
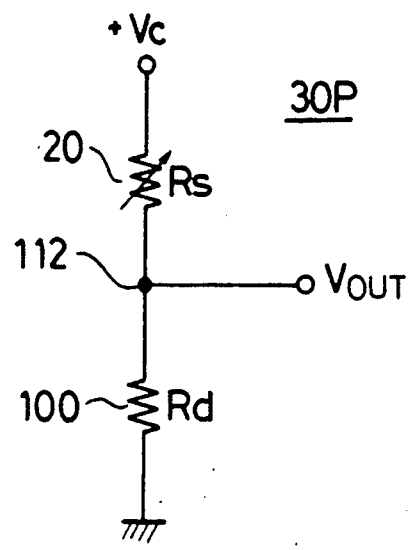
FIG. 7 is a circuit diagram showing a conventional detector circuit for a pressure responsive sensor.

FIG. 7 shows a conventional detector circuit for detecting a squeezed object, generally indicated by reference numeral 30P. Referring to FIG. 7, a pressure responsive sensor 20 (e.g., the pressure responsive sensor 20A shown in FIG. 5) having a variable resistance indicated by $R_s$ and a reference resistor 100 having a fixed reference resistance $R_d$ are connected in series between a positive voltage $V_C$ and the ground, thereby constituting a voltage dividing circuit. An output voltage $V_{OUT}$ of the detector circuit 30P is extracted from a contact between the pressure responsive sensor 20 and the reference resistance 100. Therefore, the output voltage $V_{OUT}$ from the detector circuit 30 is given by:

$$V_{OUT} = \frac{R_4}{R_s + R_d} \cdot V_C$$

In this arrangement, the output voltage $V_{OUT}$ from the detector circuit 30P is saturated with respect to a relatively high pressure on the sensor 20. In other words, sensitivity of the output signal $V_{OUT}$ is reduced within the range of high pressures generated when an object is squeezed. Therefore, this detector circuit 30P cannot detect a squeezed object with high reliability.

Figure 8:
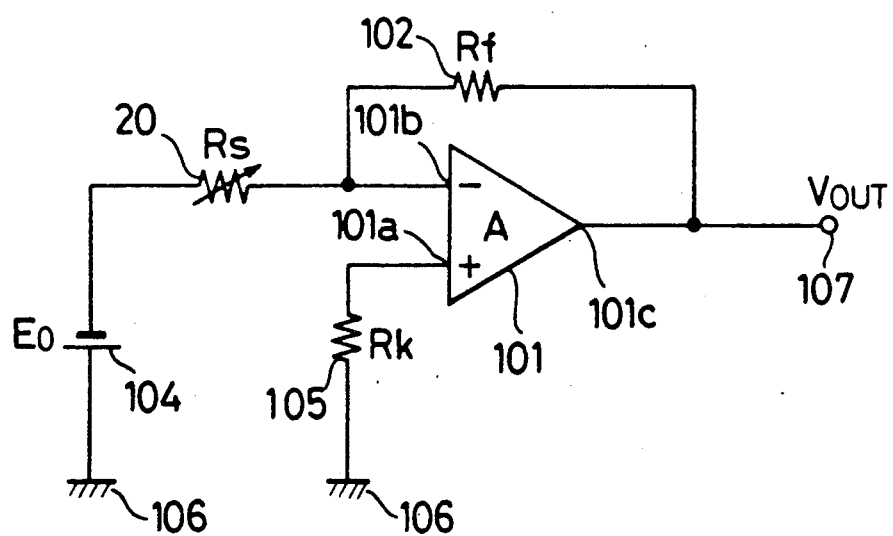
FIG. 8 is a circuit diagram showing a detector circuit (suitable for use in the system shown in FIG. 1) having improved sensitivity for a pressure.

FIG. 8 shows an arrangement of a preferred detector circuit generally denoted by reference numeral 30A. This detector circuit 30A supplies an output voltage $V_{OUT}$ substantially inversely related to a resistance $R_s$ of a pressure responsive sensor 20 as a function of a pressure on the pressure responsive sensor 20. For this purpose, the detector circuit 30A includes an operational amplifier (A) 101.

A non-inverting input terminal 101a of the operational amplifier (A) 101 is connected to ground 106 via a resistor 105 having a resistance $R_k$. A negative feedback resistor 102 having a resistance $R_f$ is connected between an output terminal 101c and an inverting input terminal 101b. One end of the pressure responsive sensor 20 having a variable resistance $R_s$ depending on a pressure P on the sensor 20 is connected to the inverting input terminal 101b. The other end of the pressure responsive sensor 20 is connected to another reference voltage source 104 for generating a predetermined reference voltage $E_0$ between the reference voltage source 104 and the ground 106.

Note that reference numeral 107 denotes an output terminal of the pressure detector circuit 30A connected to the output terminal 101c of the operational amplifier (A) 101.

In the arrangement shown in FIG. 8, the output voltage $V_{OUT}$ from the detector circuit 30A is given by:

$$V_{OUT} = -(R_f/R_s) \cdot E_0 \qquad (1)$$

That is, the output voltage is inversely related to the resistance $R_s$ of the pressure responsive sensor 20. Therefore, the detector circuit 30A can correctly detect the magnitude of a pressure on the pressure responsive sensor 20.

The resistance $R_s$ of the pressure responsive sensor 20 typically satisfies the following relation with respect to the pressure P on the pressure responsive sensor 20:

$$R_s = K \cdot P^{-N} \qquad (2)$$

where K is the proportional constant and $N > 0$.

By substituting equation (2) into equation (1), the following relation is obtained between the pressure and the output voltage $V_{OUT}$:

$$V_{OUT} = -(R_f E_0/K) \cdot P^N \qquad (3)$$

That is, assuming that a pressure on the pressure responsive sensor 20 is P, the output voltage $V_{OUT}$ from the detector circuit 30A is proportional to $P^N$.

Characteristics of the detection voltage (output voltage $V_{OUT}$ from the detector circuit 30A shown in FIG. 8 will be described with reference to FIGS. 9 and 10. Note that in each of FIGS. 9 and 10, the abscissa indicates the pressure P and the ordinate indicates the output voltage $V_{OUT}$.

Figure 9:
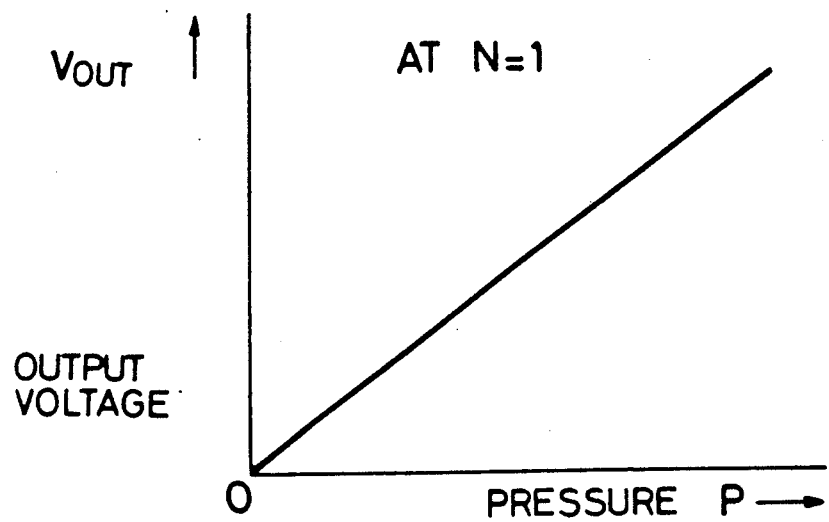
FIG. 9 is a graph showing a characteristic of an output voltage as a function of a pressure of the detector circuit shown in FIG. 8.

FIG. 9 shows characteristics obtained when N is 1 in equation (3). As shown in FIG. 9, the output voltage $V_{OUT}$ is essentially linearly proportional to the pressure P, and a rate of change (sensitivity) of the output voltage $V_{OUT}$ with respect to a unit pressure change is constant regardless of the magnitude of the pressure P. For this reason, reliability of detection of the pressure P and therefore reliability of detection of a squeezed foreign matter (object) are improved.

Figure 10:
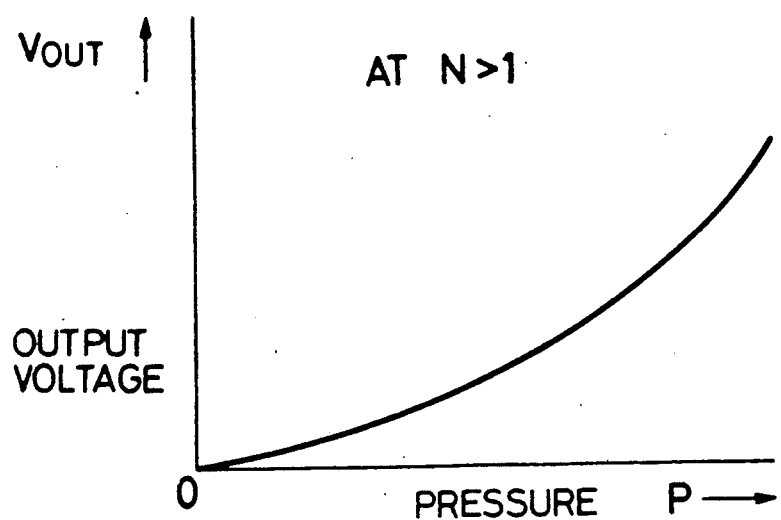
FIG. 10 is a graph showing another characteristic of the output voltage as a function of the pressure of the detector circuit shown in FIG. 8.

FIG. 10 shows characteristics obtained when N is larger than 1 in equation (3). As shown in FIG. 10, as the pressure P is increased, the rate of change (sensitivity) of the output voltage $V_{OUT}$ is increased. Therefore, a high pressure can be correctly detected.

Although the voltage $E_0$ of the reference voltage source 104 has a negative value in FIG. 8, it may have a positive value. In this case, the ordinate in FIG. 9 or 10 indicates negative values. If the voltage $E_0$ is set to be 0 (i.e., the other end of the pressure responsive sensor 20 is essentially grounded), another reference voltage source corresponding to the reference voltage source 104 is provided between the resistor 105 and the ground 106 to supply a bias voltage to the non-inverting input terminal 101a.

When the bias voltage is supplied as described above, the same voltage as the bias voltage is included in the output voltage $V_{OUT}$ in equation (3).

A comparator circuit (not shown) may be coupled to the output terminal 107 of the detector circuit 30A to compare the output voltage $V_{OUT}$ with the reference voltage with respect to a squeezed object, thereby outputting a signal indicative of the presence/absence of a squeezed object.

Figure 11:
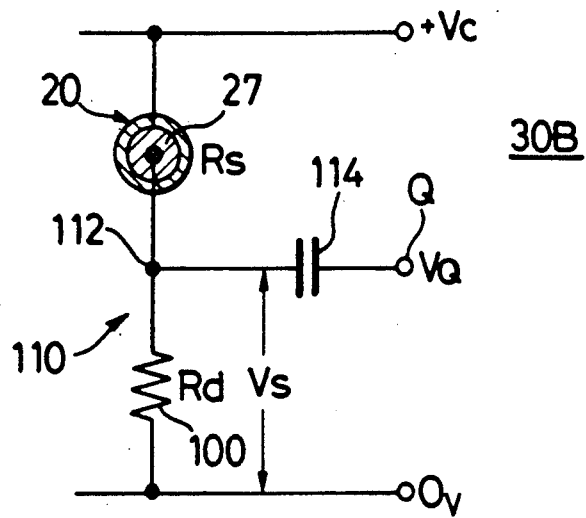
FIG. 11 is a circuit diagram showing a detector circuit, suitable for use in the system shown in FIG. 1, for giving an output indicative of a rate of change of a pressure.

FIG. 11 shows an arrangement of another preferred detector circuit generally denoted by reference numeral 30B. This detector circuit 30B generates a signal indicative of a change in resistivity of the pressure responsive sensor 20 (i.e., a rate of change of a pressure on the pressure responsive sensor 20), thereby detecting a squeezed object.

The detector circuit 30B has a pressure detector circuit 110 constituted by a resistor 100 connected in series with the pressure responsive sensor 20. This circuit 110 is the same as the circuit shown in FIG. 7. Instead of the circuit 110, the pressure detector circuit 30A shown in FIG. 8 can be used. The detector circuit 30B further has a capacitor 114 coupled to a node 112 (or 107) of the pressure detector circuit 110 (or 30A). The capacitor 114 functions as a differentiation circuit for removing a DC component of the pressure signal $V_s$ at the node 112, thereby differentiating the pressure signal $V_s$.

An output terminal Q is connected to the capacitor 114. Therefore, a voltage $V_Q$ at the output terminal Q is represented by:

$$V_Q = dV_s/dt$$

The output voltage $V_Q$ therefore represents a rate of change of a pressure on the pressure responsive sensor 20. The detector circuit 30B for a rate of change of a pressure can detect a squeezed object with high reliability.

A digital differentiation circuit can be used in place of the capacitor 114. More specifically, an A/D converter (not shown) is coupled to the output terminal 112 (or 107) of the pressure detector circuit 110 (or 30A), and the A/D converter forms a digital sample of a pressure signal at a predetermined sampling rate. Thereafter, a subtractor calculates a difference between two arbitrary digital samples.

Figure 12A:
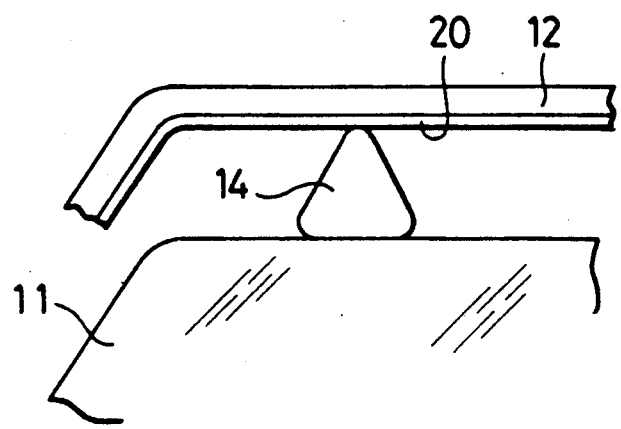
FIGS. 12A and 12B are views each showing an object squeezed in a way of a window.
Figure 12B:
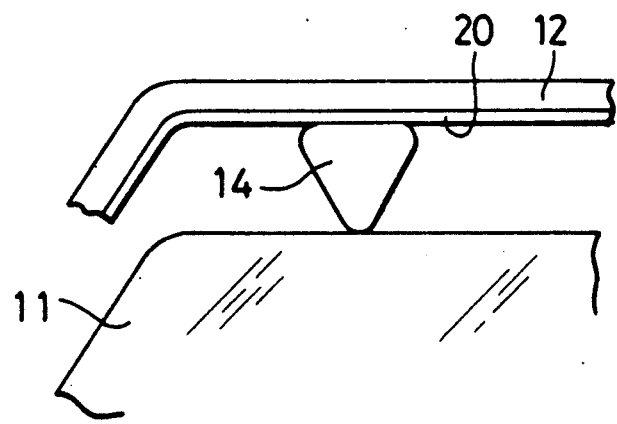

Referring to FIGS. 12A and 12B, the object 14 (e.g., a hand) is squeezed between the window glass 11 ahd the window frame 12 having the pressure responsive sensor 20. In FIG. 12A, an area of the object 14 in contact with the pressure responsive sensor 20 is smaller than that shown in FIG. 12B. Assuming that a force applied to the object 14 is the same in FIGS. 12A and 12B, a pressure on the pressure responsive sensor 20 shown in FIG. 12A having a comparatively small contact area with the object 14 is generally higher than that of the pressure responsive sensor 20 shown in FIG. 12B.

Assuming that the pressure detector circuit 30P (110) or 30B (for detecting a squeezed object in accordance with the magnitude of a pressure) is connected to the pressure responsive sensor 20, the detector circuit does not detect a squeezed object until the window glass 11 is further moved upward to apply a higher (damaging) pressure, than that applied in the state shown in FIG. 12B in which the contact area is large, on the object 14 in the state shown in FIG. 12A in which the contact area is small.

This problem can be solved by using the differentiation type detector circuit 30B as shown in FIG. 11 having a combination of the differentiation circuit 114 for evaluating the rate of change of a pressure on the pressure responsive sensor 20 and the pressure detector circuit 110 or 30A.

Another advantage of the detector circuit 30B shown in FIG. 11B is that the detector circuit 30B is essentially insusceptible to semistationary changes (e.g., external environmental changes such as aging, a humidity change and a temperature change) of the pressure responsive sensor 20.

The presence of a squeezed object is indicated when the voltage at the output terminal Q of the detector circuit 30B shown in FIG. 11 exceeds a predetermined voltage level. In order to assure this operation, a comparator (not shown) may be provided such that a first input of the comparator is coupled to the output terminal Q and its second input is coupled to a predetermined reference voltage. In stead of the comparator, a semiconductor logic gate (see a gate 54 in FIG. 1) having a predetermined threshold voltage may be coupled to the output terminal Q. An output signal of logic "1" from the comparator or logic gate indicates the presence of a squeezed object.

Figure 13:
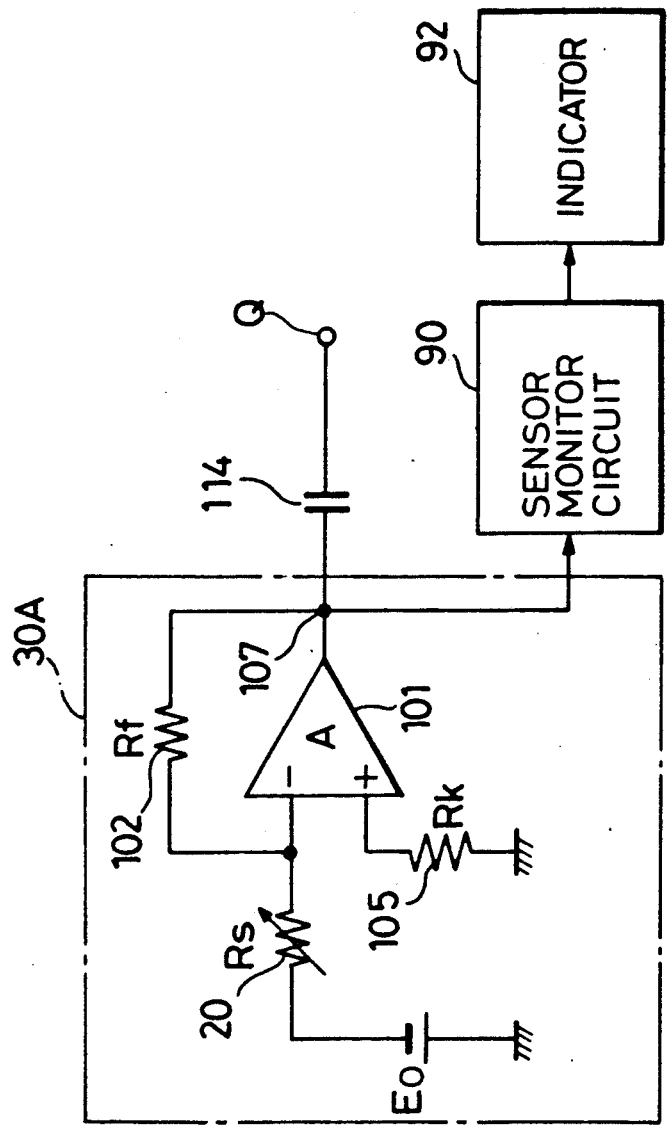
FIG. 13 is a circuit diagram showing a detector circuit having a sensor fault diagnosing function.

FIG. 13 shows a squeezed object detector circuit including the differential capacitor 114 coupled to the pressure detector circuit 30A shown in FIG. 8 at the terminal 107. In this arrangement, since a voltage signal at the output terminal 107 of the pressure detector circuit 30A has improved sensitivity with respect to a comparatively high pressure on the pressure responsive sensor 20, the differentation output terminal Q generates a signal having a comparatively H (HIGH) level in response to a squeezed object. In this manner, improved sensitivity can be obtained with respect to the squeezed object.

The arrangement shown in FIG. 13 further includes a monitor circuit 90, coupled to the pressure detector circuit 30A, for diagnosing a fault (characteristic degradation, disconnection, short-circuiting and the like) of the pressure responsive sensor 20. An indicator 92 is coupled to the monitor circuit 90 to indicate a current condition of the pressure responsive sensor 20.

Figure 14:
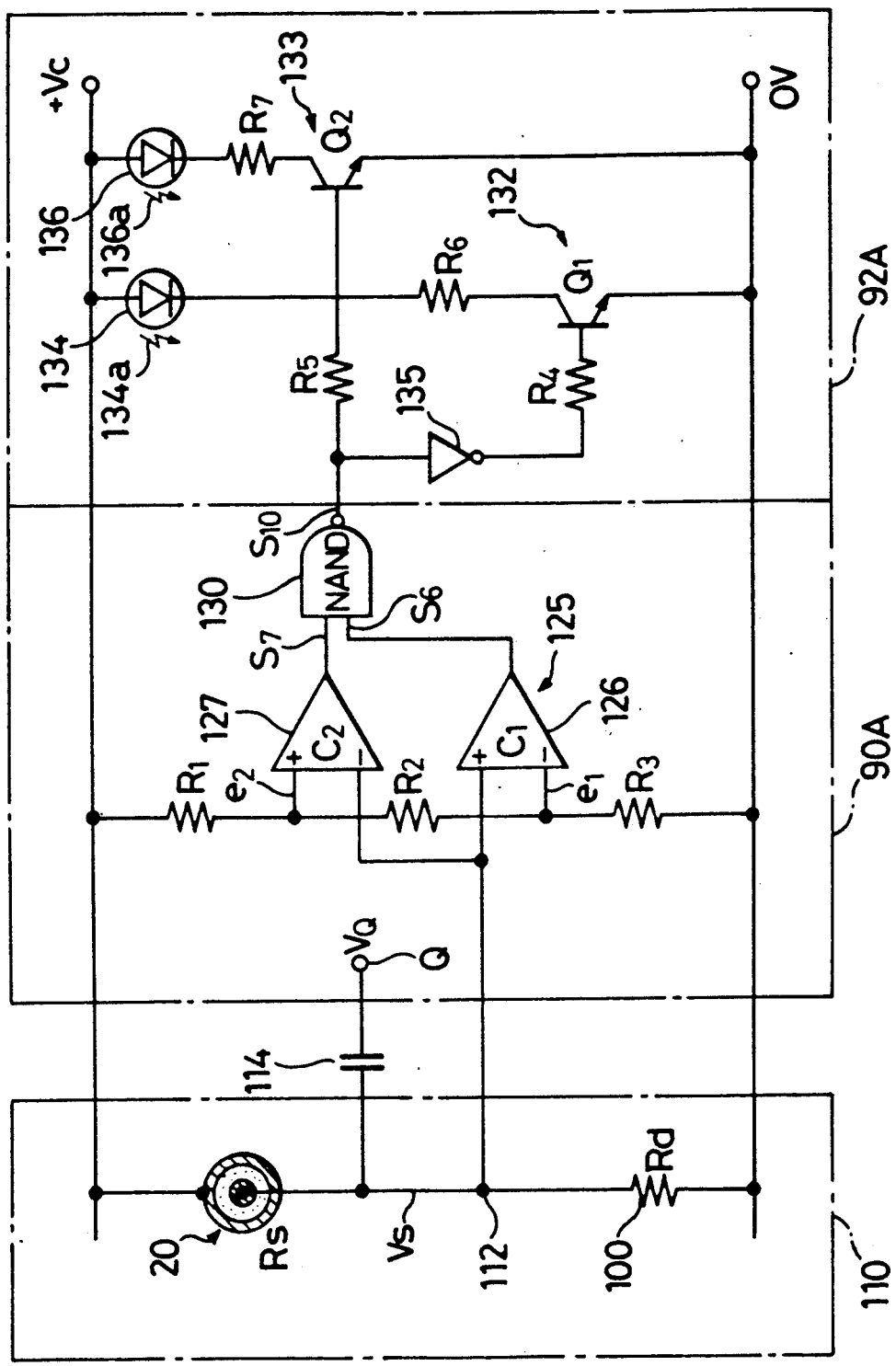
FIG. 14 is a circuit diagram showing detailed arrangements of a sensor monitor circuit and an indicator shown in FIG. 13.

FIG. 14 shows an arrangement including a practical arrangement (denoted by reference numeral 90A) of the monitor circuit 90. The monitor circuit 90A is coupled to the output terminal 112 of the pressure detector circuit 110 of a pressure dividing type. As shown in FIG. 13, the pressure detector circuit 30A including the operational amplifier (A) 101 may be coupled to the monitor circuit 90A instead of the pressure detector circuit 110. A voltage $V_s$ at the terminal 112 (or 107) is a function of a resistance of the pressure responsive sensor 20 which is a function of a pressure on the pressure responsive sensor 20. When the pressure responsive sensor 20 normally operates and no squeezed object is present, the resistance of the pressure responsive sensor 20 falls within a certain normal range, and the voltage at the terminal 112 (or 107) is therefore assumed to fall within a certain normal range.

The monitor circuit 90A is arranged to check whether the voltage at the output terminal 112 (or 107) of the pressure detector circuit as a measure of the resistance of the pressure responsive sensor 20 falls within a predetermined normal range indicating a normal state of the pressure responsive sensor 20. An indicator circuit 92A including green and red light-emitting diodes 134 and 136 is coupled to the monitor circuit 90A. When the voltage at the terminal 112 (or 107) falls within the normal range, the green light-emitting diode 134 is turned on. When the voltage at the terminal 112 (or 107) falls outside the normal range, the red light-emitting diode 136 is turned on to indicate a fault of the pressure responsive sensor 20.

More specifically, a comparator circuit 125 is coupled to a pressure signal $V_S$ of the output terminal 112 (or 107) of the pressure detector circuit. The comparator circuit 125 is constituted by first and second voltage comparators ($C_1$) 126 and ($C_2$) 127. The detection voltage (pressure signal) $V_S$ is supplied to the non-inverting input terminal of the first voltage comparator ($C_1$) 126 and the inverting input terminal of the second voltage comparator ($C_2$) 127. The inverting input terminal of the first comparator ($C_1$) 126 and the non-inverting input terminal of the second comparator ($C_2$) 127 receive comparative voltages $e_1$ and $e_2$ ($e_1 < e_2$) obtained by dividing the power source voltage $V_C$ by resistors $R_1$ to $R_3$, respectively.

When the detection voltage $V_S$ satisfies a relation of $e_1 < V_S < e_2$, both of signals $S_6$ and $S_7$ output from the first and second voltage comparators ($C_1$) 126 and ($C_2$) 127 to a NAND gate 130 go to H level. When the value of the detection voltage $V_S$ is between the comparative voltages $e_1$ and $e_2$ (i e., a normal value), an output signal $S_{10}$ from the NAND gate 130 is at L (LOW) level.

The output signal $S_{10}$ from the NAND gate 130 is supplied to the indicator circuit 92A. The indicator circuit 92A is provided to alarm the state of the pressure responsive sensor 20 and constituted by a normal state indicator circuit 132 and an abnormal state indicator circuit 133.

The normal state indicator circuit 132 is constituted by an npn transistor $Q_1$ and a green light-emitting diode 134 connected to the collector of the transistor $Q_1$ via a resistor $R_6$. The output signal $S_{10}$ from the NAND gate 130 is supplied to the base of the transistor $Q_1$ via an inverting amplifier (inverter) 135 and a resistor $R_4$. The abnormal state indicator circuit 133 is constituted by an npn transistor $Q_2$ and a red light-emitting diode 136 connected to the collector of the transistor $Q_2$ via a resistor $R_7$. The output signal $S_{10}$ from the NAND gate 130 is supplied to the base of the transistor $Q_2$ via a resistor $R_5$.

When the output signal $S_{10}$ from the NAND gate 130 is at L level indicative of a normal state of the pressure responsive sensor 20, the transistor $Q_1$ is turned on and the transistor $Q_2$ is turned off. As a result, the green light-emitting diode 134 is turned on to radiate green light 134a. When the output signal $S_{10}$ from the NAND gate 130 is at H level indicative of a fault of the pressure responsive sensor 20, the transistor $Q_2$ is turned on and the transistor $Q_1$ is turned off. As a result, the red light-emitting diode 136 is turned on to radiate red light 136a.

From light emission of the green light-emitting diode 134, therefore, a driver can recognize that the pressure responsive sensor 20 is in a normal state. From light emission of the red light-emitting diode 136, a driver can recognize that the pressure responsive sensor 20 is in an abnormal state.

When the output signal $S_6$ from the first voltage comparator ($C_1$) 126 is at L level, i.e., when the detection voltage $V_S$ is lower than the comparative voltage $e_1$ indicative of the lower limit, disconnection or a defective connection of the pressure responsive sensor 20 or degradation in the pressure responsive element 27 can be assumed.

When the output signal $S_7$ from the second voltage comparator ($C_2$) 127 is at L level ($V_S >$ upper limit $e_2$), short-circuiting of the pressure responsive sensor 20, an excessive pressure on the pressure responsive sensor 20, or degradation in the pressure responsive element 27 can be assumed.

If necessary, indicators (not shown) for indicating the output signal $S_6$ from the lower-limit voltage comparator ($C_1$) 126 and the output signal $S_7$ from the upper-limit voltage comparator ($C_2$) 127, respectively, may be provided.

[C] Motor Control Circuit

Figure 15:
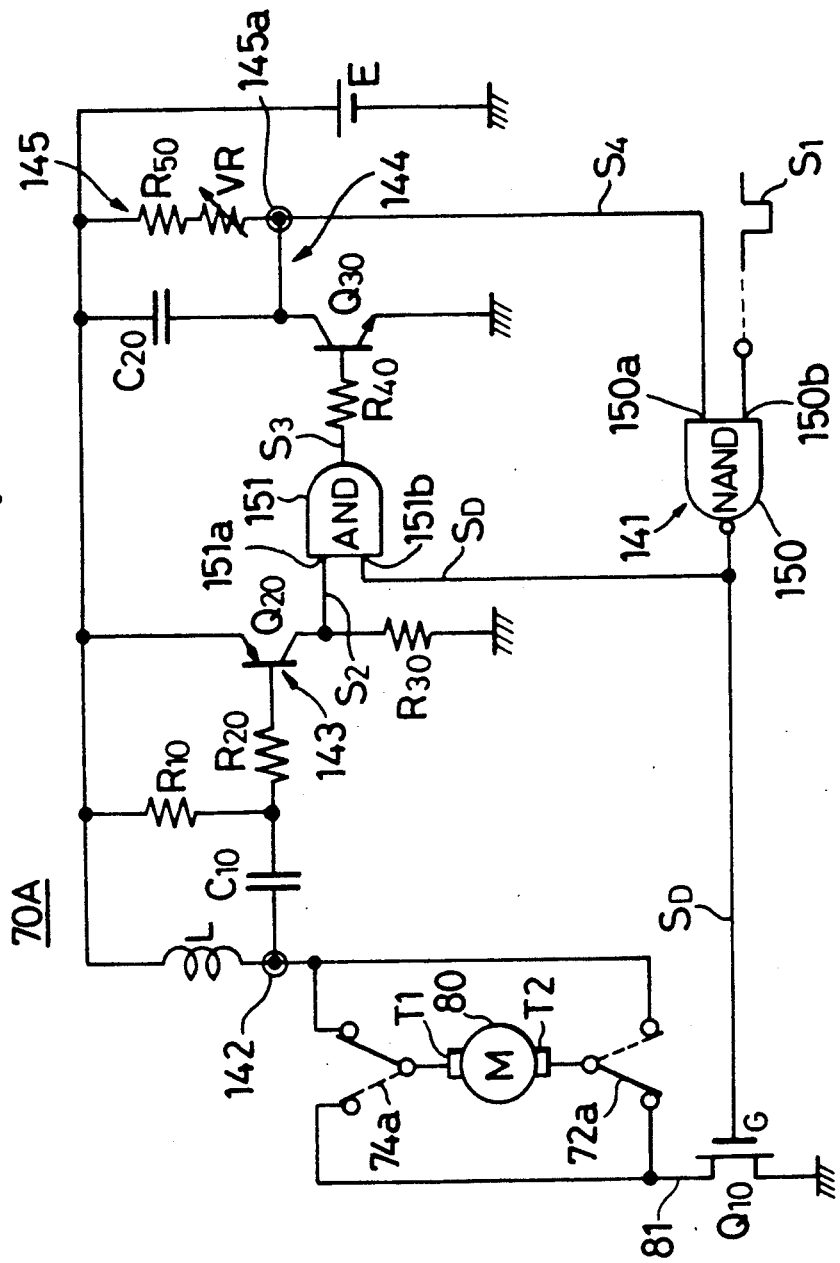
FIG. 15 is a circuit diagram showing a detailed arrangement of a motor control circuit shown in FIG. 1.

FIG. 15 shows a preferred arrangement of the motor control circuit generally denoted by reference numeral 70A to be applied to the automatic window opening/closing system as shown in FIG. 1. A pair of relay contacts 72a and 74a are provided on a power supply line 81 of the DC motor 80. The relay contact 72a is a contact of the downward movement relay 72 (FIG. 1) and moved from a position indicated by a solid line to a position indicated by a broken line when a downward movement relay coil is energized. In this case, the motor 80 is set so as to rotate in a first direction (to open a window).

The relay contact 74a is a contact of the upward movement relay 74 (FIG. 1) and moved from a position indicated by a broken line to a position indicated by a solid line when an upward movement relay coil is energized. In this case, the motor 80 is set so as to rotate in an opposite direction (to close the window). The power supply line 81 of the motor 80 includes a power source E, an inductor 142 having an inductance L, the motor 80 and a power FET (power transistor) $Q_{10}$ to be ON/OFF-controlled, all of which are connected in series with each other.

When the DC motor 80 is stopped, a high-level voltage is supplied to one and the other input terminals 150a and 150b of a NAND gate 150 constituting a motor drive signal generating circuit 141. A voltage at the output terminal of the NAND gate 150 is at L level. The output voltage from the NAND gate 150 is supplied as an ON/OFF control signal $S_D$ to a gate electrode G of the power transistor $Q_{10}$.

The power transistor $Q_{10}$ is a field effect transistor provided between a terminal $T_2$ of the DC motor 80 and the ground to drive the DC motor 80. The power transistor $Q_{10}$ is turned off when the ON/OFF control signal $S_D$ is at L level and is turned on when the signal $S_D$ is at H level. When an activation signal $S_1$ of L level is supplied to the other terminal 150b of the NAND gate 150, the ON/OFF control signal $S_D$ output from the NAND gate 150 goes to H level.

As a result, the power transistor $Q_{10}$ is turned on since the potential of the gate electrode G goes to H level, and a drive voltage is supplied from the power source E to the DC motor 80, thereby rotating the DC motor 80. Each time the motor 80 is rotated through a predetermined angle, polarity switching (connection switching between an armature winding and the power supply line 81) occurs, and a pulse P having a repetition rate essentially proportional to a rotational speed of the motor 80 appears at a motor terminal $T_1$.

Figure 16:
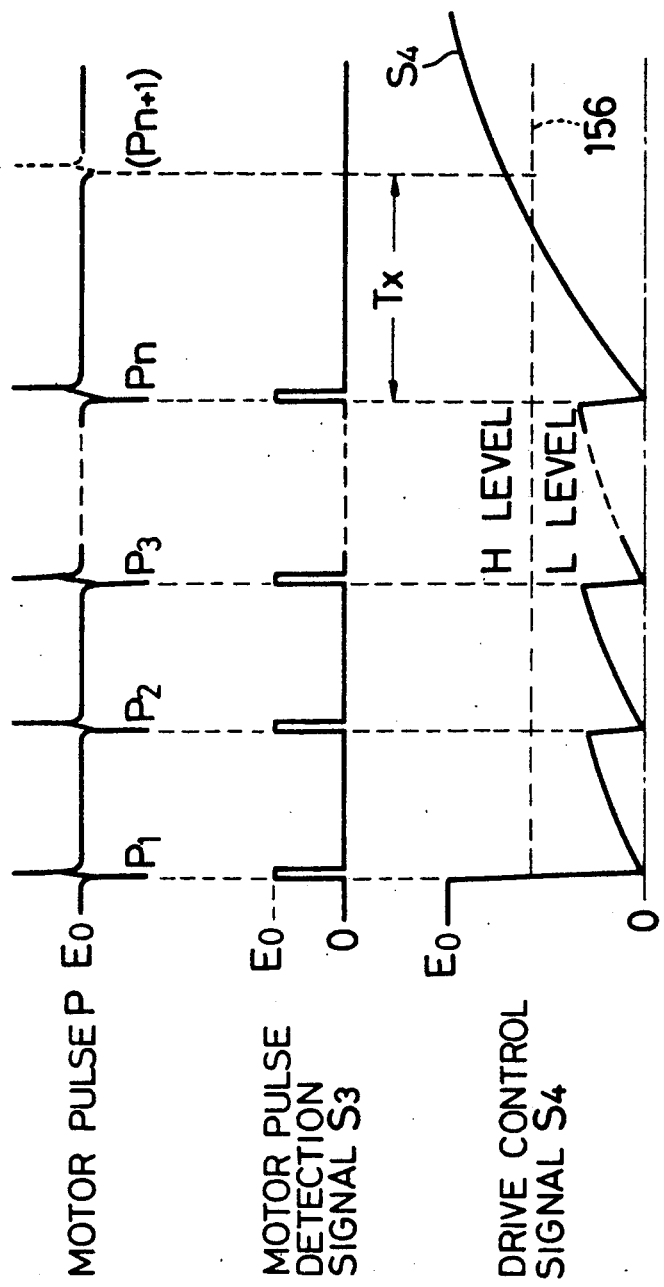
FIG. 16 is a timing chart showing signals of the motor control circuit shown in FIG. 15.

As shown in FIG. 16, the motor pulse P is abruptly and instantaneously generated in positive and negative directions. In this embodiment, the inductance L having a high impedance with respect to a high frequency is inserted between the motor terminal $T_1$ and the power source E to facilitate detection of the motor pulse P.

The motor pulse P is extracted from the contact 142 between the motor terminal $T_1$ and the inductor L and supplied to a pulse detector circuit 143 including a capacitor $C_{10}$. The pulse detector circuit 143 further includes a transistor $Q_{20}$, biasing resistors $R_{10}$ and $R_{20}$ connected to the base of the transistor $Q_{20}$, a resistor $R_{30}$ connected to the collector of the transistor $Q_{20}$ and an AND gate 151. The pulse P extracted from the contact 142 is supplied to a connection between the resistors $R_{10}$ and $R_{20}$ via the capacitor $C_{10}$ and to the base of the transistor $Q_{20}$ via the resistor $R_{20}$.

The transistor $Q_{20}$ is a PNP transistor. The transistor $Q_{20}$ is therefore instantaneously turned on in response to a negative component of the motor pulse P, and a positive pulse voltage having a generation interval of the motor pulse P (therefore, a generation interval corresponding to the rotational speed of the motor 80) appears at the collector of the transistor $Q_{20}$.

This collector voltage $S_2$ is supplied to one input terminal of the AND gate 151. The ON/OFF control signal $S_D$ from the NAND gate 150 is coupled to the other input terminal 151b of the AND gate 151. When the ON/OFF control signal $S_D$ is at H level, a positive motor pulse detection signal $S_3$ corresponding to motor pulses $P_1, P_2, P_3, \ldots, P_n$ as shown in FIG. 16 is supplied from the output terminal of the AND gate 151 to a drive period varying circuit (charging/discharging circuit) 144.

The drive period varying circuit 144 comprises a transistor $Q_{30}$ and a time constant circuit 145 including a capacitor $C_{20}$ connected to the collector of the transistor $Q_{30}$, a variable resistor VR and a resistor $R_{50}$. The motor pulse detection signal $S_3$ from the AND gate 151 is supplied to the base of the transistor $Q_{30}$ via a resistor $R_{40}$. The transistor $Q_{30}$ is therefore instantaneously turned on each time the motor pulse detection signal $S_3$ is supplied.

As a result, a reference voltage at L level is established at an output terminal 145a of the time constant circuit 145 to charge the capacitor $C_{20}$. Thereafter, the charged capacitor $C_{20}$ is discharged via the resistor $R_{50}$ and the variable resistor VR after the resetting transistor $Q_{30}$ is turned off by removing the motor pulse detection signal $S_3$. As a result, the potential at the output terminal 145a of the time constant circuit 145 gradually rises in accordance with a discharging time constant determined by the capacitor $C_{20}$, the resistor $R_{50}$ and the variable resistor VR.

The voltage output from the output terminal 145a is supplied to one terminal 150a of the NAND gate 150 as a drive control signal $S_4$. As shown in FIG. 16, the drive control signal $S_4$ repeats a pattern in which it falls (is reset) to 0 volt (ground level) upon generation of the motor pulse P and rises from 0 volt to a voltage $E_0$ of the power source E until the next motor pulse P is generated.

The generation interval of the motor pulse P is proportional to the rotational speed of the motor 80. Therefore, when the DC motor 80 rotates at a predetermined speed or higher, the next motor pulse P is generated to reset the drive control signal $S_4$ to be the ground level before the drive control signal $S_4$ exceeds a threshold voltage 156 of the NAND gate 150. Therefore, in a normal drive state in which the motor 80 rotates at a predetermined speed or higher, the ON/OFF control signal $S_D$ from the NAND gate 150 is kept at H level to maintain conduction of the power transistor $Q_{10}$ and continue energization of the motor 80.

If, however, the rotational speed of the DC motor 80 is decreased by an overload (restraint) state of the motor caused by a squeezed object, the generation interval of the motor pulse P is prolonged as indicated by an interval $T_X$ between $P_n$ and $P_{n+1}$ in FIG. 16. As a result, the drive control voltage $S_4$ exceeds the threshold value voltage 156 before the next motor pulse $P_{n+1}$ is generated. Therefore, since the output signal $S_D$ from the NAND gate 150 goes to L level, the power transistor $Q_{10}$ is turned off to stop power supply to the DC motor 80.

In addition, since the AND gate 151 is disabled by the low-level signal $S_D$ from the NAND gate 150, the motor pulse detection signal $S_3$ is no longer supplied to the charging/discharging circuit 144, and the OFF state of the power transistor $Q_{10}$ is maintained. Therefore, since no electric energy is supplied to the motor 80, the motor 80 is stopped. In this manner, by stopping power supply to the DC motor 80 when the DC motor 80 is restrained, heat generation of the motor 80 is prevented.

Since a DC motor control circuit 70A shown in FIG. 15 detects the constraint state of the motor 80 on the basis of the generation interval of the pulse P indicative of the rotational speed of the motor 80, its operation is not adversely affected by a variation in power supply voltage.

In addition, since the DC motor control circuit 70A has no resistor for motor current detection, heat generation or an electric energy loss of the circuit can be minimized.

By varying the time constant of the charging/discharging circuit 144 by the variable resistor VR, a maximum interval of the pulse P in which the ON state of the power transistor $Q_{10}$ can continue (therefore, a critical rotational speed of the motor 80 for stopping the motor 80) can be arbitrarily set.

Figure 17:
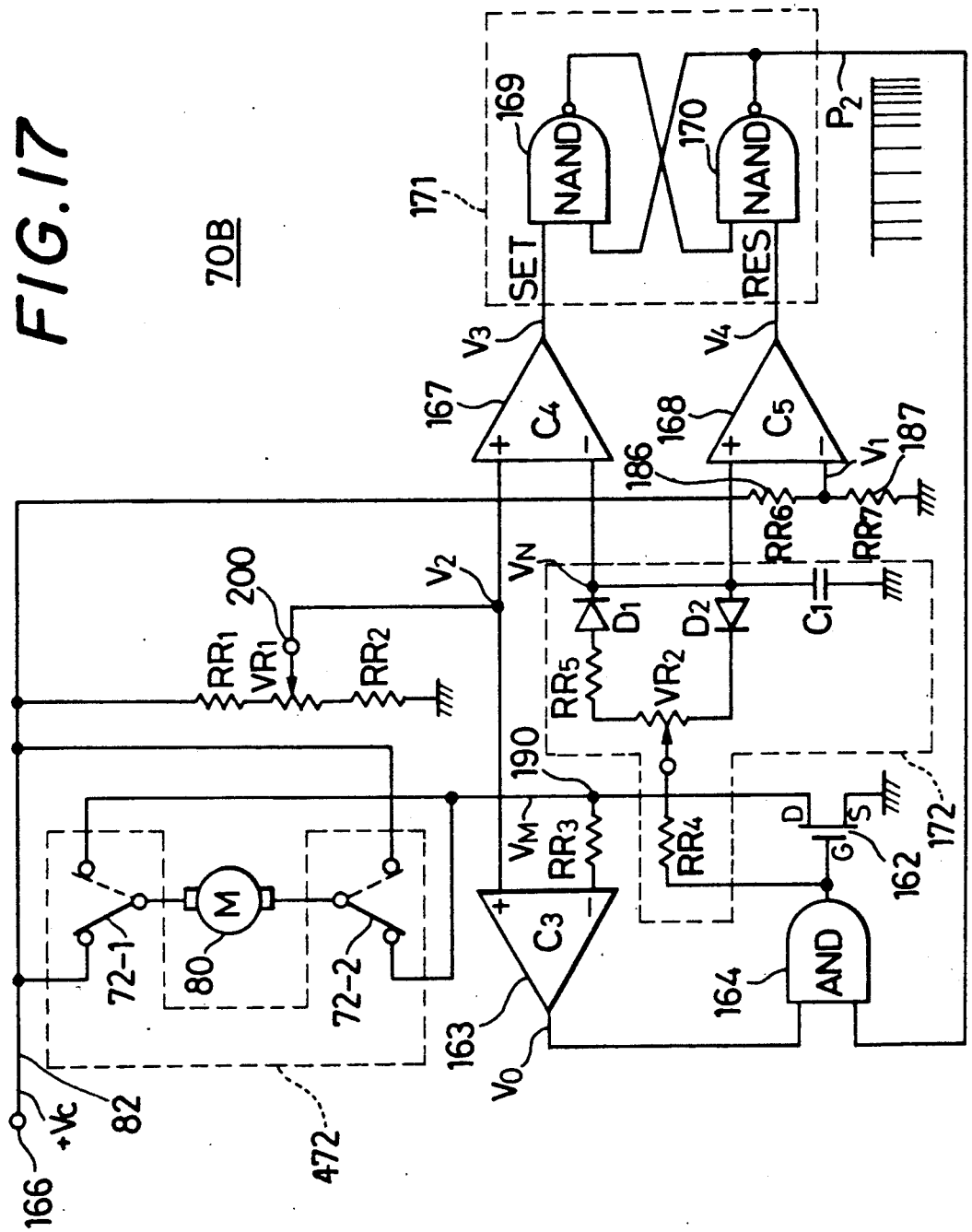
FIG. 17 is a circuit diagram showing another arrangement of the motor control circuit shown in FIG. 1.

FIG. 17 shows another preferred arrangement of a motor control circuit generally denoted by reference numeral 70B. A pair of relay contacts 72-1 and 72-2 for setting a rotation direction of the DC motor 80 are provided on a power supply line 82 for the motor 80. A single relay coil (not shown) controls positions of the contacts 72-1 and 72-2. In a downward movement mode (window opening mode), both the contacts 72-1 and 72-2 are positioned as indicated by broken lines to set the DC motor 80 to rotate in a first direction (to open the window). In an upward movement mode (window closing mode), both the contacts 72-1 and 72-2 are moved to positions indicated by solid lines to set the DC motor 80 to rotate in a direction (to close the window) opposite to the first direction.

The power supply line 82 for the motor 80 includes a power source (not shown) for connecting a terminal 166 and the ground, the relay contact 72-1 connected in series with the power source, the motor 80, the relay contact 72-2 and a driving power transistor (FET) 162. A voltage dividing circuit comprising a resistor $RR_1$, a variable resistor $VR_1$ and a resistor $RR_2$ is coupled between a positive voltage $V_C$ of the terminal 166 and the ground. The voltage dividing circuit supplies an adjustable reference voltage $V_2$, indicative of a critical repetition rate of the motor 80 for stopping the motor 80, for controlling a period of a sawtooth wave signal $V_N$ from a sawtooth wave forming circuit (to be described later).

The reference voltage $V_2$ is coupled to the non-inverting input terminal of a comparator ($C_3$) 163, and a voltage $V_M$ indicative of the motor rotational speed at a point 190 on the power supply line between the motor 80 and the power transistor 162 is coupled to the inverting input terminal of the comparator ($C_3$) 163 via a resistor $RR_3$. When $V_M > V_2$ (i.e., when the motor rotational speed is lower than a reference critical rotational speed), the comparator ($C_3$) 163 supplies an output signal $V_0$ of L level. When $V_M < V_2$ (i.e., when the motor rotational speed is higher than a reference critical rotational speed), the comparator ($C_3$) 163 supplies an output signal $V_0$ of H level.

The output signal $V_0$ from the comparator ($C_3$) is coupled to the first input of an AND gate 164, and an output signal $P_2$ from a pulse forming circuit (to be described later) having a flip-flop arrangement is coupled to the second input of the AND gate 164.

An output signal from the AND gate 164 is coupled to the gate electrode G of the power transistor 162 to ON/OFF-control the power transistor 162. The power transistor 162 is biased to be off by the output signal of L level from the AND gate 164. The power transistor 162 is biased to be on by the output signal of H level from the AND gate 164 to supply power to the motor 80. In addition, the output signal from the AND gate 164 is coupled to a sawtooth wave forming circuit (charging/discharging circuit) 172.

The sawtooth wave forming circuit 172 comprises resistors $RR_4$ and $RR_5$, a variable resistor (speed setting unit) $VR_2$, diodes $D_1$ and $D_2$ and a capacitor $C_1$. That is, the resistor $RR_4$ is connected between the gate electrode G of the power transistor 162 and a slidable contact of the variable resistor $VR_2$. One end of the variable resistor $VR_2$ is connected to one end of the resistor $RR_5$, the other end of the resistor $RR_5$ is connected to the anode of the diode $D_1$, and the cathode of the diode $D_1$ is connected to the anode of the diode $D_2$ and grounded via the capacitor $C_1$.

The other end of the variable resistor $VR_2$ is connected to the cathode of the diode $D_2$, and the anode of the diode $D_2$ is connected to the capacitor $C_1$ and the cathode of the diode $D_1$. The AND gate 164, the resistor $RR_4$, the variable resistor $VR_2$, the resistor $RR_5$ and the capacitor $C_1$ form a charging circuit. The AND gate 164, the resistor $RR_4$, the variable resistor $VR_2$, the diode $D_2$ and the capacitor $C_1$ form a discharging circuit. A junction between the capacitor $C_1$ and each of the diodes $D_1$ and $D_2$ is an output terminal of the sawtooth wave forming circuit 172.

A voltage $V_N$ at the output terminal of the sawtooth wave forming circuit 172 is connected to the inverting input terminal of a voltage comparator ($C_4$) 167 and the non-inverting input terminal of the voltage comparator ($C_5$) 168. The non-inverting input terminal of the voltage comparator ($C_4$) 167 is connected to a reference voltage $V_2$ at a slidable contact 200 of a torque controlling variable resistor $VR_1$. When the output voltage $V_N$ from the sawtooth wave forming circuit 172 is lower than a set voltage $V_2$, the voltage comparator ($C_4$) 167 outputs a voltage $V_3$ of H level. When the sawtooth output voltage $V_N$ from the circuit 172 exceeds the set voltage $V_2$, the voltage comparator ($C_4$) 167 outputs a voltage $V_3$ of L level.

The output signal from the voltage comparator ($C_4$) 167 is connected to a set input terminal SET of the pulse forming circuit 171. Upon application of the low-level voltage $V_3$ indicative of $V_N > V_2$ from the comparator ($C_4$) 167, the pulse forming circuit 171 is set to output a signal $P_2$ of L level for interrupting power supply to the motor 80.

The inverting input terminal of the voltage comparator ($C_5$) 168 receives a reference voltage ($V_1$) ($V_1 < V_2$) obtained by dividing a DC power source voltage $+V_C$ by resistances $RR_6$ and $RR_7$ of resistors 186 and 187, respectively. Therefore, the voltage comparator 168 compares the sawtooth wave signal $V_N$ from the sawtooth wave forming circuit 172 with the reference voltage $V_1$. When the voltage $V_N$ is higher than the voltage $V_1$, the voltage comparator ($C_5$) 168 outputs a voltage $V_4$ of H level. When the voltage $V_N$ is lower than the voltage $V_1$, the voltage comparator ($C_5$) 168 outputs the voltage $V_4$ of L level.

The output terminal of the voltage comparator ($C_5$) 168 is connected to a reset input terminal RES of the pulse forming circuit 171. The pulse forming circuit 171 is reset by the voltage $V_4$ of L level indicative of $V_N < V_1$ from the comparator ($C_4$) 167, and its output signal $P_2$ changes to H level.

In this embodiment, the pulse forming circuit 171 is constituted by an RS flip-flop composed of cross-coupled NAND gates 169 and 170.

The pulse forming circuit 171 operates to cause the charging/discharging circuit 172 to repeatedly generate a sawtooth wave signal. When the charging/discharging circuit 172 is charged and its output voltage $V_N$ reaches the upper limit reference voltage $V_2$, the pulse forming circuit 171 is set to output the signal $P_2$ of L level, thereby discharging the charging/discharging circuit 172 via the AND gate 164. When the output voltage $V_N$ from the charging/discharging circuit 172 falls to the lower limit reference voltage $V_1$, the pulse forming circuit 171 is reset to output the signal $P_2$ of H level, thereby charging the charging/discharging circuit 172 (provided that the signal $V_0$ of H level indicative of normal rotation of the motor 80 is supplied from the comparator ($C_3$) 163).

Figure 18:
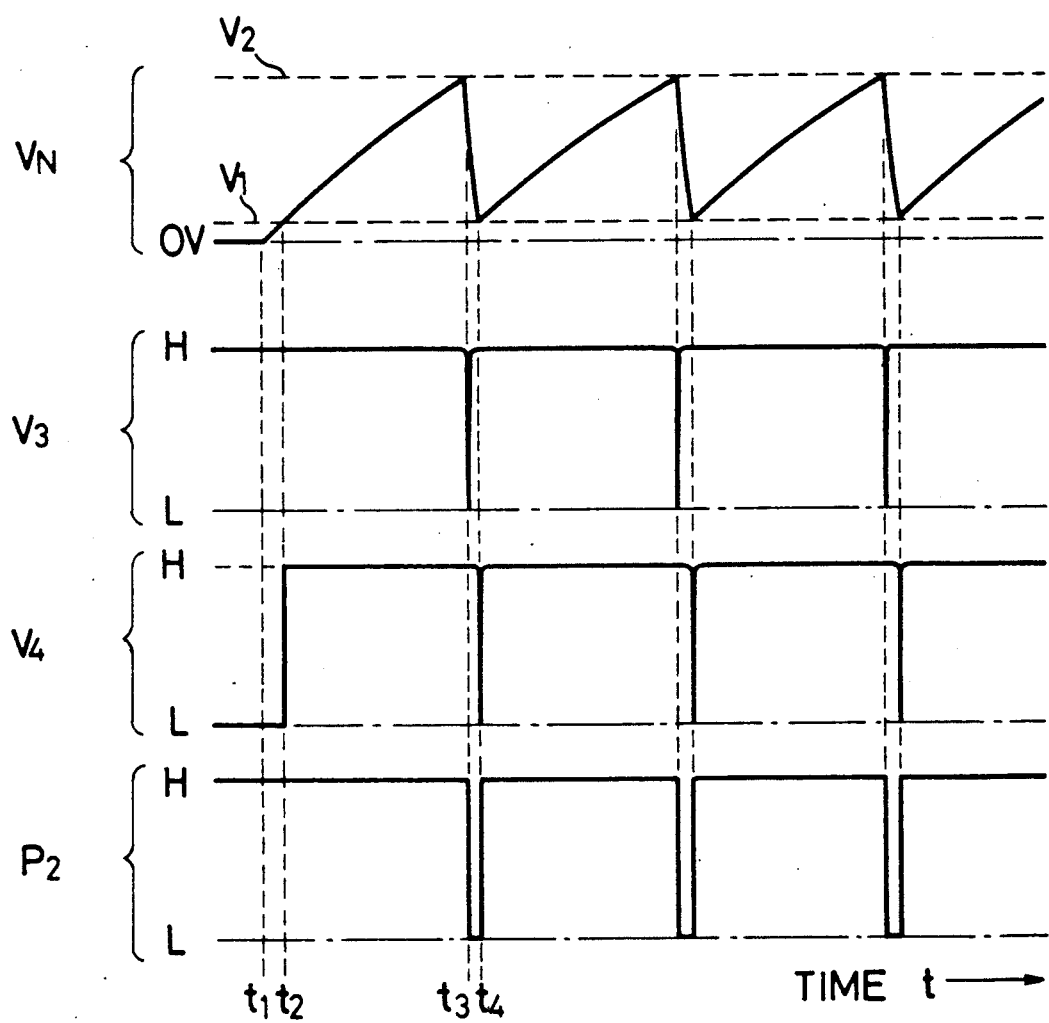
FIG. 18 is a timing chart showing signals of the motor control circuit shown in FIG. 17.

An operation of the DC motor control circuit 70B shown in FIG. 17 will be described below with reference to a timing chart shown in FIG. 18. FIG. 18 is a timing chart showing voltage waveforms of main parts of the DC motor control circuit 70B shown in FIG. 17.

Assuming that the DC motor 80 is stopped. Since an induced electromotive force of the DC motor 80 is zero when the DC motor 80 is stopped, the voltage $V_M$ is equal to the DC power source voltage $+V_C$. Since, therefore, the voltage $V_M$ is higher than the set voltage $V_2$, the output voltage $V_0$ from the voltage comparator 163 is at L level. For this reason, since the output signal from the AND gate 164 is also at L level, a drain-source path of the power transistor 162 is in an OFF state. In addition, since the output signal from the AND gate 164 is at L level, the output voltage $V_N$ from the sawtooth wave forming circuit 172 is a voltage (0 V) of L level (before time $t_1$ in FIG. 18).

Since the output voltage $V_N$ from the sawtooth wave forming circuit 172 is at L level, the output voltage $V_3$ from the voltage comparator 167 is a voltage of H level. Similarly, the output voltage $V_4$ from the voltage comparator ($C_5$) 168 is a voltage of L level. Therefore, the voltage $V_3$ of H level is supplied to the set input terminal SET of the pulse forming circuit 171, and the voltage $V_4$ of L level is supplied to its reset input terminal RES.

Since the voltage $V_4$ supplied to the reset input terminal RES is at L level, the pulse forming circuit 171 outputs the output signal $P_2$ of H level from its output terminal as indicated at time $t_1$ in FIG. 18. This output signal $P_2$ of H level is supplied to the input terminal of the AND gate 164.

Assuming that an output shaft (not shown) of the DC motor 80 is rotated by a starter (not shown) and an armature connected to the output shaft is rotated. Upon rotation of the armature, an electromotive force $E_M$ is induced across the DC motor 80. Therefore, the motor terminal voltage $V_M$ is reduced from the DC power source voltage $+V_C$. When the motor terminal voltage $V_M$ becomes lower than the set voltage $V_2$ as the motor rotational speed is increased, the voltage comparator (C$_3$) 163 changes its output voltage $V_0$ from L to H level.

At this time, since the output signal $P_2$ from the pulse forming circuit 171 is a voltage of H level, a signal of H level is supplied to the gate electrode G of the power transistor 162 via the AND gate 164, thereby turning on the power transistor 162. As a result, the DC power source voltage $+V_C$ is applied to the DC motor 80 to allow the output shaft of the DC motor 80 to continuously rotate.

By the voltage of H level from the AND gate 164, the capacitor C$_1$ is charged via the resistor RR$_4$, the variable resistor VR$_2$, the resistor RR$_5$ and the diode D$_1$ in the sawtooth wave forming circuit 172 (in a period from time t$_1$ to time t$_2$ in FIG. 18). Therefore, the output voltage $V_N$ from the sawtooth wave forming circuit 172 gradually rises. When the voltage $V_N$ reaches the value of the reference voltage $V_1$, the voltage comparator (C$_5$) 168 changes its output voltage $V_4$ from L to H level (at the time t$_2$ in FIG. 18) and supplies it to the reset input terminal RES of the pulse forming circuit 171.

The state of the pulse forming circuit 171, however, is not changed by the above voltage but the output signal $P_2$ of H level is maintained.

After time t$_2$, the output voltage $V_N$ from the sawtooth wave forming circuit 172 is further increased. When the voltage $V_N$ reaches the value of the set voltage $V_2$, the voltage comparator (C$_4$) 167 changes its output voltage $V_3$ from H to L level (at time t$_3$ in FIG. 18). When the voltage $V_3$ goes to L level, a voltage of L level is input to the set input terminal SET of the pulse forming circuit 171. Therefore, the pulse forming circuit 171 is set to change its output signal $P_2$ to be a voltage of L level.

As a result, the AND gate 164 is disabled, and its output signal goes to L level. Therefore, the power transistor 162 is turned off to temporarily interrupt power supply to the DC motor 80.

By the output signal of L level from the AND gate 164, the capacitor C$_1$ immediately starts discharging via a path constituted by the diode D$_2$, the variable resistor VR$_2$ and the resistor RR$_4$. Therefore, the output voltage $V_N$ from the sawtooth wave forming circuit 172 is immediately reduced to be lower than the set voltage $V_2$.

When the output voltage $V_N$ from the sawtooth wave forming circuit 172 falls to be lower-limit set voltage $V_1$, the output voltage $V_4$ from the comparator (C$_5$) 168 goes to L level. Therefore, the pulse forming circuit 171 is reset to return its output signal $P_2$ to H level.

At this time, if the output voltage signal $V_0$ of H level is generated by the comparator (C$_3$) 163, the power transistor 162 is turned on again by the AND gate 164 to restart power supply to the motor 80. Therefore, as long as the motor 80 normally rotates, the sawtooth wave forming circuit 172 generates the output voltage $V_N$ having a repetitive sawtooth waveform. In a waveform rise period from time t$_2$ to time t$_3$ (charging period), the power transistor is kept on to supply power to the motor 80. In a waveform fall period from time t$_3$ to time t$_4$ (discharging period), the power transistor 162 is biased to be off to disconnect the motor 80 from the power source.

If, however, a squeezed object is present or the terminal end of a way of a window is reached to increase the load on the motor 80 to set the motor 80 is an overload state, the rotational speed of the motor is reduced or the motor 80 is stopped. When the motor 80 is disconnected from the power source, the terminal voltage $V_M$ of the motor 80 has a magnitude indicative of a rotational speed of the motor 80. When the rotational speed of the motor 80 is reduced upon overloading, the voltage $V_M$ becomes higher than the set voltage $V_2$, and a signal of L level for disabling the AND gate 164 is supplied from the comparator (C$_3$) 163 to the AND gate 164.

The AND gate 164, therefore, no longer passes the signal $P_2$ of H level from the pulse forming circuit 171, and the power transistor 162 is not turned on thereafter. As a result, the motor 80 is kept disconnected from the power source. In this manner, the motor control circuit 70B detects the overload state of the motor 80 and stops power supply to the motor 80 in response to the overload state, thereby preventing heat generation of the motor 80.

Referring to FIG. 17, the set voltage $V_2$ defines the critical rotational speed of the motor 80 associated with the overload state of the motor 80. The set voltage $V_2$ also has a function of adjusting a period of the output voltage (sawtooth wave signal) $V_N$ from the sawtooth wave forming circuit 172 (therefore, an ON/OFF cycle time of the power transistor 162). The set voltage $V_2$ can be arbitrarily adjusted by the variable resistor VR$_1$. A charging/discharging time constant (i.e., a charging-to-discharging time ratio of the sawtooth waveform signal $V_N$) and therefore a duty ratio of the motor 80 can be adjusted by the variable resistor VR$_2$ in the sawtooth wave forming circuit 172.

With these features, the motor control circuit 70B can adjust a constraint torque of the motor (the motor 80 is stopped upon establishment of the conditions of the torque) throughout a wide range and can select a desired window opening/closing speed, thereby realizing a desired motor-driven window opening/closing system.

Although the present invention has been described in detail above, it is obvious to those skilled in the art that the present invention can be variously modified and changed without departing from the gist of the invention. Therefore, the gist of the present invention is to be limited by only the appended claims.

What is claimed is:

1. A motor-driven window/door system comprising:
   a pressure responsive sensor arranged in association with a window or door;
   detector circuit means coupled to said pressure responsive sensor for detecting a squeezed object caught in the way of said window or door;
   an electric motor for driving said window or door to open/close said window or door; and
   control circuit means for controlling said motor;
   wherein said pressure responsive sensor comprises a coaxial sensor having an inner electrode, an outer electrode and a pressure responsive element interposed between said inner and outer electrodes and having a variable resistance responsive to pressure on said pressure responsive sensor;
   said detector circuit means comprises pressure detector means coupled to said pressure responsive sensor for generating a signal indicative of a pressure on said pressure responsive sensor, and differentiation means coupled to said pressure detector means for generating a signal indicative of a rate of change of said pressure; and said control circuit means comprises direction control means coupled to said detector circuit means for controlling said motor in response to the squeezed object to release said object from said window or door, overload detector means coupled to said motor for detecting an overload condition of said motor including means for repeatedly interrupting the power supplied to said motor, electromotive force detector means for detecting a voltage appearing across said motor upon interruption by said interrupting means and having a magnitude essentially proportional to the rotational speed of said motor, and comparator means coupled to said electromotive force detector means, for comparing the voltage with a predetermined reference voltage and power-down means including deenergizing means, coupled to said comparator means, for deenergizing said motor in response to a signal from said overload detector means indicative of an overload of said motor.

* * * * *